United States Patent [19]

Tanner

[11] 4,118,222

[45] Oct. 3, 1978

[54] GLASSY HAFNIUM-BERYLLIUM ALLOYS

[75] Inventor: Lee E. Tanner, Summit, N.J.

[73] Assignee: Allied Chemical Corporation, Morris Township, Morris County, N.J.

[21] Appl. No.: 802,743

[22] Filed: Jun. 2, 1977

[51] Int. Cl.$^2$ .............................................. C22C 27/00
[52] U.S. Cl. .................................................. 75/134 V
[58] Field of Search .................. 75/134 V, 134 N, 150

[56] References Cited

U.S. PATENT DOCUMENTS

| 3,856,513 | 12/1974 | Chen | 75/122 |
| 3,960,200 | 6/1976 | Kavesh | 164/281 |
| 3,989,517 | 11/1976 | Tanner et al. | 75/178.5 |

OTHER PUBLICATIONS

"Constitution of Binary Alloys, First Supplement," R. P. Elliot, pp. 162–163, McGraw-Hill Book Co., N.Y. (1965).

*Primary Examiner*—Arthur J. Steiner
*Attorney, Agent, or Firm*—Gerhard H. Fuchs; David W. Collins

[57] ABSTRACT

Glassy hafnium-beryllium alloys are provided comprising about 40 to 60 atom percent beryllium and the balance hafnium. The alloys evidence good corrosion resistance and are dimensionally stable in nuclear applications.

4 Claims, No Drawings

GLASSY HAFNIUM-BERYLLIUM ALLOYS

BACKGROUND OF THE INVENTION

1. Field of the Invention

The invention relates to glassy metal alloys, and in particular, to glassy hafnium-beryllium alloys.

2. Description of the Prior Art

Glassy metal alloys in wire form have been disclosed by H. S. Chen et al. U.S. Pat. No. 3,856,513, issued Dec. 24, 1974. The glassy metal alloys have the formula $T_iX_j$, where T is at least one transition metal element and X is at least one metalloid selected from the group consisting of aluminum, antimony, beryllium, boron, germanium, carbon, indium, phosphorus, silicon and tin, and where "$i$" ranges from about 70 to 87 atom percent and "$j$" ranges from about 13 to 30 atom percent. As is now well-known, such glassy materials evidence no substantial long-range order. In distinguishing a glassy substance from a crystalline substance, X-ray diffraction measurements are generally suitably employed. Additionally, transmission electron microscopy and electron diffraction can be used to distinguish between glassy and the crystalline state.

A glassy substance produces an X-ray diffraction pattern in which intensity varies slowly with diffraction angle. Such a profile is qualitatively similar to the diffraction profile of a liquid or ordinary window glass. On the other hand, a crystalline material produces a diffraction profile in which intensity varies rapidly with diffraction angle.

These glassy materials exist in a metastable state. Upon heating to a sufficiently high temperature, they crystallize with evolution of a heat of crystallization, and the X-ray diffraction profile changes from one having glassy characteristics to one having crystalline characteristics.

It is possible to produce a metal which is totally glassy or which comprises a two-phase mixture of the glassy and crystalline states. The term "glassy metal" as employed herein refers to a metal which is primarily glassy, but which may have some fraction of the material present as included crystallites. However, since an increasing degree of glassiness results in increasing degree of ductility, it is preferred that the glassy alloy be substantially glassy.

In nuclear reactor technology, hafnium often finds use as control rods because of its high neutron absorption properties and corrosion resistance in hot water. In the fabrication of control rods and the like, hafnium parts are often joined, such as by brazing, to Zircaloy-type and other zirconium-base parts and to other hafnium parts. However, the material used in joining, or brazing, hafnium to zirconium-based parts or hafnium to hafnium often fails due to its poor corrosion resistance or dimensional instability.

SUMMARY OF THE INVENTION

In accordance with the invention, glassy hafnium-beryllium alloys are provided. The alloys comprise from about 40 to 60 atom percent beryllium and the balance hafnium. The alloys of the invention find a number of uses in nuclear reactor technology, including use as brazing materials to join hafnium to zirconium-base parts and hafnium to hafnium parts.

Being glassy, these alloys are isotropic, and accordingly, evidence dimensional stability. The glassy alloys also evidence good corrosion resistance.

DETAILED DESCRIPTION OF THE INVENTION

The hafnium-beryllium glassy alloys of the invention comprise about 40 to 60 atom percent (about 3.3 to 7.0 weight percent) beryllium and the balance hafnium. Outside this range, the compositions do not easily form a substantially homogeneous, substantially glassy phase at quench rates of about $10^5$ to $10^{6\circ}$ C./sec. The purity of all materials described is that found in normal commerical practice. However, it is contemplated that minor additions of other alloying elements may be made without an unacceptable reduction in the desired properties. Such additions may be made, for example, to aid the glass-forming behavior. More specifically, up to about a maximum of about 10 atom percent of hafnium and/or beryllium may be replaced by other elements, such as transition metal elements (Groups IB to VIIB and Group VIII, Rows 4, 5 and 6 of the Periodic Table, other than hafnium) and metalloid elements (boron, carbon, silicon, aluminum, tin, phosphorus, germanium, indium and antimony). Especially preferred are boron, carbon and/or silicon.

The equilibrium phase diagram of the Hf-Be system, published in *Constitution of Binary Alloys, First Supplement*, by R. P. Elliott, pp. 162–163, McGraw-Hill Book Co., N.Y. (1965) suggests a peritectic point of about 1270° C. at about 2 atom percent Be and a eutectic point of about 1125° ± 30° C. at about 43 atom percent Be. The phase diagram, however, appears to be largely unexplored except for several Be-rich intermetallic compounds ranging from $HfBe_2$ to $HfBe_{13}$.

In the crystalline state, the compositions of the invention would be of little utility, since the crystalline compositions are observed to be hard, brittle and almost invariably multiphase, and cannot be shaped or formed. Consequently, these compositions cannot be rolled, forged, etc. to form ribbon, wire, sheet and the like. In contrast, the glassy metal alloys of the invention, which are advantageously prepared as filaments, are substantially homogeneous, single phase and ductile. The term "filament" as used herein includes any slender body whose transverse dimensions are much smaller than its length, examples of which include ribbon, wire, strip, sheet and the like having a regular or irregular cross-section.

For alloys consisting essentially of about 40 to 60 atom percent beryllium and the balance hafnium plus incidental impurities, as the amount of beryllium is increased from 40 to 60 atom percent, the density decreases from about 10.2 to 8.8 g/cm$^3$, the the crystallization temperature increases from about 500° to 530° C. and the hardness increases from about 715 to 955 kg/mm$^2$.

The glassy alloys of the invention are formed by cooling an alloy melt of the appropriate composition at a rate of at least about $10^{5\circ}$ C./sec. A variety of techniques are available, as is well-known in the art, for fabricating rapidly-quenched continuous filament. Typically, a particular composition is selected, powders of the requisite elements (or of materials that decompose to form the elements) in the desired proportions are melted and homogenized, and the molten alloy is rapidly quenched on a chill surface, such as a rapidly rotating cylinder. Due to the highly reactive nature of these compositions, it is preferred that the alloys be fabricated in an inert atmosphere or in a partial vacuum.

The hafnium-beryllium glassy alloys of the invention evidence high hardness, high corrosion resistance and high electrical resistivity. These alloys are also ductile and are thermally stable up to about 700° K. Since they are isotropic, these alloys exhibit good dimensional stability against thermal and radiation effects. Finally, the melting points of these alloys, which range from about 1125° to 1310° C., are considerably lower than that of Zircaloy-2 (1640° C.) and hafnium (2200° C.). The glassy alloys of the invention are considered suitable for brazing such materials.

For brazing applications, it is evident that the temperature of brazing should be kept substantially below the lowest melting point of the parts being joined. Compositions consisting essentially of about 41 to 49 atom percent beryllium and the balance hafnium melt at no more than about 1200° C. and hence are preferred in brazing applications.

EXAMPLES

Continuous ribbons of specific compositions of the glassy metal alloys of the invention were fabricated in vacuum employing quartz crucibles and extruding molten material onto a rapidly rotating copper chill wheel (surface speed about 3000 to 6000 ft/min) by overpressure of argon. A partial pressure of about 200 $\mu$m of Hg was employed. The degree of glassiness was determined by X-ray diffraction. A cooling rate of at least about $10^5$° C./sec was attained by the quenching process.

Hardness was measured by the diamond pyramid technique using a Vickers-type indenter, consisting of a diamond in the form of a square-base pyramid with an included angle of 136° between opposite faces. Loads of 100 g were applied. Crystallization temperature was measured by differential thermal analysis at a scan rate of about 20° C./min. Electrical resistivity was measured at room temperature by a conventional four-probe method.

The following values of hardness in kg/mm$^2$, density in g/cm$^3$, crystallization temperature in ° C. and electrical resistivity in $\mu\Omega$-cm, listed in the Table below, were measured for a number of compositions falling within the scope of the invention.

| Composition (atom percent) | Hardness (kg/mm$^2$) | Density (g/cm$^3$) | Crystallization Temperature (° C) | Electrical Resistivity ($\mu\Omega$-cm) |
|---|---|---|---|---|
| Hf$_{60}$Be$_{40}$ | 715.3 | 10.19 | 497 | — |
| Hf$_{58}$Be$_{42}$ | 736.8 | 10.31 | 502 | — |
| Hf$_{50}$Be$_{50}$ | 780.3 | 10.08 | 507 | 307.0 |
| Hf$_{45}$Be$_{55}$ | 868.8 | 9.05 | 517 | 348.0 |
| Hf$_{40}$Be$_{60}$ | 955.5 | 8.75 | 527 | — |

What is claimed is:

1. A hafnium-base metal alloy which is primarily glassy consisting essentially of about 40 to 60 atom percent beryllium and the balance hafnium plus incidental impurities.

2. The alloy of claim 1 which is substantially glassy.

3. The alloy of claim 1 which consists essentially of about 41 to 49 atom percent beryllium and the balance hafnium plus incidental impurities.

4. The alloy of claim 1 which is in the form of continuous filament.

* * * * *